July 16, 1963    B. W. TAYLOR ETAL    3,097,518
APPARATUS FOR GAS ANALYSIS
Filed Sept. 22, 1958    4 Sheets-Sheet 1

INVENTORS.
Billy W. Taylor
Albert Anthony Poli, Jr.
BY
Webb Mackey & Burden
THEIR ATTORNEYS July 16, 1963     B. W. TAYLOR ETAL     3,097,518
APPARATUS FOR GAS ANALYSIS Filed Sept. 22, 1958     4 Sheets-Sheet 2

INVENTORS.
Billy W. Taylor
Albert Anthony Poli, Jr.
BY

THEIR ATTORNEYS

INVENTORS.
Billy W. Taylor
Albert Anthony Poli, Jr.

BY

*Webb Mackey Burden*

THEIR ATTORNEYS

United States Patent Office 3,097,518
Patented July 16, 1963

3,097,518
APPARATUS FOR GAS ANALYSIS
Billy W. Taylor and Albert Anthony Poli, Jr., Pittsburgh, Pa., assignors to Fisher Scientific Company, Pittsburgh, Pa., a corporation of Pennsylvania
Filed Sept. 22, 1958, Ser. No. 762,472
9 Claims. (Cl. 73—23)

This application relates to apparatus for gas analysis utilizing the principles of gas chromatography wherein mixtures of gases may be analyzed, both quantitatively and qualitatively, more rapidly than heretofore has been possible.

The principles and techniques of gas chromatography are well known. They involve the passage of a known quantity of a gas to be analyzed into a carrier stream of gas of known composition, which carrier stream carries the mixture to be analyzed into a chromatographic column. The various components making up the mixture pass through the column at different rates of speed so that they emerge from the column at different times. The individual components making up the mixture to be analyzed pass from the chromatographic column into a thermal conductivity cell containing detectors which actuate a device for indicating a signal proportional to the thermal conductivity of the component. The indicating device may be an indicating instrument which is read by an operator. Preferably, it is a conventional recording instrument which records the signals received against time. The order in which the individual components in the mixture emerge from the chomatographic column is known and, therefore, the signal read or recorded for each individual component can readily be identified as to the component which caused the signal. If a recording device is used and is properly calibrated, the quantity of the individual component present in the mixture being analyzed can also be determined.

To analyze a gas mixture having a large number of individual components, gas chromatographic techniques heretofore known have required a cumbersome amount of equipment and have also required a considerable amount of time to complete the analysis of such a gas. We have invented a gas chromatographic technique involving an arrangement of chromatographic columns and conductivity cells wherein much less equipment than has heretofore been required can be used to accomplish the same result. Moreover, a full analysis can be accomplished much more quickly than has heretofore been possible and without continuous attention on the part of an operator. We have also invented a thermal conductivity cell particularly suited for carrying out our method of gas analysis.

In the accompanying drawings, we have illustrated certain presently preferred embodiments of our invention, in which.

Figure 1:
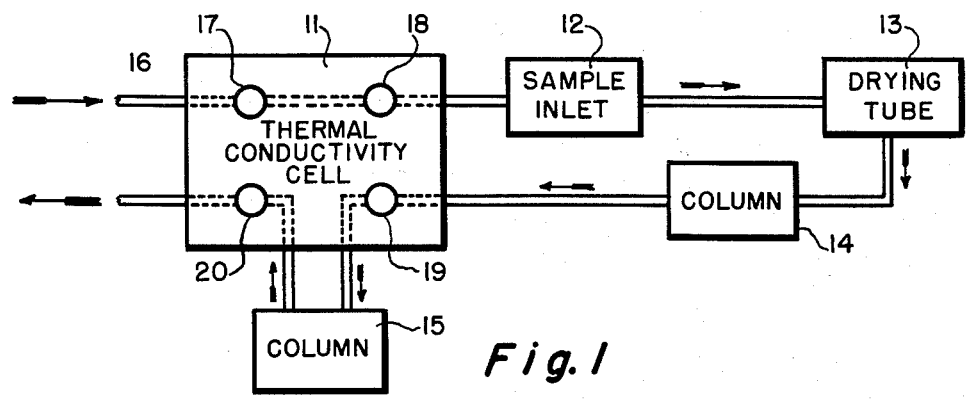
FIGURE 1 is a block diagram illustrating the arrangement of apparatus which we have invented for carrying out our process of gas analysis.

Referring to FIGURE 1 of the drawings, apparatus for carrying out our process of gas chromatography comprises a thermal conductivity cell 11, hereinafter described in detail, a sample inlet 12, a drying tube 13, a first absorption column 14, and a second absorption column 15. A carrier gas, preferably helium, is passed into the thermal conductivity cell 11 through a passage 16, wherein it passes over two reference detectors 17 and 18 through the sample inlet to the drying tube, then to the column 14 through a sampling detector 19 to the second column 15, then to a second sampling detector 20, and thence to exhaust.

As stated, the thermal conductivity cell will be described in detail hereinafter. It should here be noted, however, that the cell employs as detectors four thermistors, two of which, 17 and 18, are used as reference thermistors and two of which, 19 and 20, are used as sampling thermistors. The four thermistors are electrically connected to a conventional recording device (not shown) so that signals initiated by the passage of gas components past the thermistors may be recorded. The electrical connections are later described with reference to FIGURE 6.

The operation of the apparatus shown in FIGURE 1 will now be described using as an example the analysis of a typical gas mixture having the following components: oxygen, nitrogen, methane, carbon monoxide, carbon dioxide, ethylene, and water vapor. Helium, as the carrier gas, is supplied to the passage 16 and flows through the system as just described. A measured sample of the gas mixture to be analyzed is then injected into the carrier gas at the sample inlet. The gas to be analyzed passes through the drying tube and then into the column 14, which is a silica gel column. This column passes, at substantially the same rate, the oxygen, the nitrogen, the carbon monoxide, and the methane found in the mixture being analyzed. Carbon dioxide, ethylene, and acetylene flow through the column at slower rates.

It should here be noted that, if it is decided to measure water vapor present in the gas mixture, the water is converted to acetylene by passing it over calcium carbide in the drying tube. The calcium carbide, however, will form calcium hydroxide which will absorb carbon dioxide and, therefore, a true quantitative reading for carbon dioxide cannot be obtained. If the presence of water vapor is not of interest, then calcium sulphate may be used in the drying tube.

From column 14, the oxygen, nitrogen, carbon monoxide, and methane passed by that column at substantially the same rate flow over the sampling thermistor 19 and, in so doing, send a large joint signal to an indicating instrument or record the signal on the chart of a recording device. This signal tells the maximum quantity of all four gases and can be used as an internal check on the analysis by relating the areas of the subsequently separated peaks to the area of the unseparated peak. The gases passed by column 14 then flow through the molecular sieve column 15, which separates oxygen, nitrogen, methane, and carbon monoxide, in that order because of their differing rates of flow through the column. Each of these components flows in that order past the sample thermistor 20, which "reads" them and sends to the recording device a signal proportional to the quantities of each, and each signal is recorded on the chart of the recording device.

During the time that the molecular sieve column 15 is separating the gases which have been passed by the silica gel column 14, the carbon dioxide, ethylene, and acetylene (if water is being analyzed) are moving slowly through the column 14. The column is designed so that these gases will not emerge from it for a sufficient length of time to permit all of the components which moved relatively rapidly through the column 14 to enter the column 15. Following or during the separation of the gases originally passed by the column 14 to the column 15, gases moving through the column 14 after or during the separation in the column 15 flow one at a time over the sample thermistor 19 and, as each passes over the sample thermistor 19, it produces a signal which may be recorded against time. The carbon dioxide, ethylene, and acetylene (if water is being analyzed) are absorbed in column 15 and do not reappear. This expedites the analysis since it is not necessary to wait for these gases to flow through the column 15.

Figure 2:
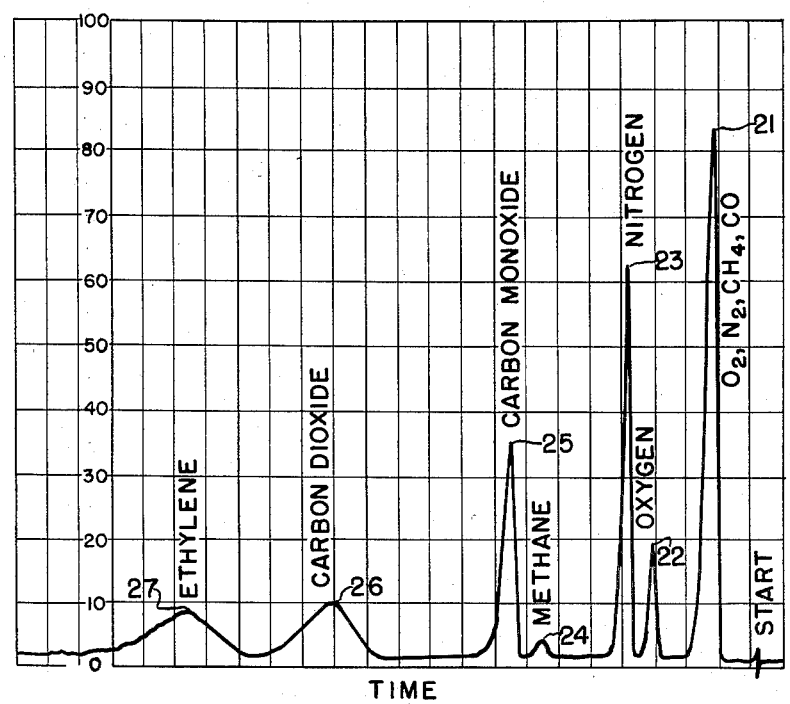
FIGURE 2 is a reproduction of a portion of a chart of a recording device utilized in connection with the equipment shown in FIGURE 1.

FIGURE 2 shows a chart record such as would be made by the analysis of a gas as just described. The chart records against time the occasion and extent of each signal as the gases pass over the sample thermistors 19 and 20. In the chart illustrated in FIGURE 2, time is the abscissa and runs from right to lift, as indicated by the word "Start" on the graph. Referring further to the chart, it illustrates the large signal 21 jointly recorded by oxygen, nitrogen, methane, and carbon monoxide when they pass over the sample thermistor 19 after passing the silica gel column 14. The next signal recorded is the signal 22 for oxygen, which occurred when the molecular sieve column 15 started separating the gases passed by the column 14. Next in order are the signal 23 for nitrogen, the signal 24 for methane, and the signal 25 for carbon monoxide.

As described above, after the column 15 has separated the components just mentioned, the column 14 separates carbon dioxide, indicated by the signal 26, and ethylene, indicated by the signal 27. If a known quantity of sample gas in injected into the inlet system, the quantity of each component present can be determined by integrating the area under the curve on the chart corresponding to each component.

The two absorption columns 14 and 15 are constructed in accordance with known techniques. The size of the columns, both in diameter and length, and the contents of the columns are selected in accordance with the nature of the gases which are to be analyzed. The important determination, so far as the selection is concerned, is that the first column which is reached by the mixture being analyzed after passing through the dryer be of such length and use such materials that it will retard the rate at which certain components in the mixture being analyzed flow through the column, so that components which flowed more rapidly through the first column will at least have reached the second column before the slower moving components emerge from the first column.

By way of specific example, to analyze the gas mixture which has been used heretofore as an example, the tubing for the silica gel column 14 has an inner diameter of $3/16$ of an inch, is made of aluminum, and is approximately 30 inches long. The silica gel is type 950 graded between 60 to 200 mesh and activated. The tubing for the column 15 is 10 feet long, has an inner diameter of $1/8$ of an inch, and is also made of aluminum. The molecular sieve is type 13X graded between 30 to 60 mesh.

It should be kept in mind throughout this description that the particular nature of the materials used in the chromatographic columns and the dimensions of the columns are determined by the nature of the gases which are being analyzed in accordance with known chromatographic techniques. We have found that the columns just described can be effectively used for analyzing a gas having the components enumerated, i.e., oxygen, nitrogen, methane, carbon monoxide, carbon dioxide, ethylene, and water vapor as acetylene. As is known to those skilled in the art of gas chromatography, the length, diameter, and contents of the columns are varied in accordance with the particular gas being analyzed. Our process contemplates the arrangement of chromatographic columns and detectors in series so that gases being analyzed pass consecutively through the columns and past the detectors, but the columns are so selected in view of the gases being analyzed that one column retards the flow of certain components of a gas mixture until other components at least reach another column for separation and reading by a detector.

Another typical analysis which can be made with the apparatus shown in FIGURE 1 is the analysis of a gas mixture containing oxygen, nitrogen, carbon monoxide, methane, ethane, carbon dioxide, and ethylene.

A sample of the mixture is injected into the sample inlet 12. Oxygen, nitrogen, carbon monoxide, and methane pass more rapidly through column 14 than the other components and produce a large joint signal as they pass over thermistor 19.

Column 15 separates these more rapidly moving components with oxygen and nitrogen first passing individually out of column 15 and each producing an individual signal as they are read by the thermistor 20.

The rate of movement of the components in both columns is such that, after nitrogen has emerged from column 15, ethane will have emerged from column 14 and by passing over the thermistor 19 it will produce its own individual signal.

The rate of movement is also such that methane and carbon monoxide will emerge from column 15 but separated from each other, and they will be read by thermistor 20. Carbon dioxide and ethylene will then emerge in that order from column 14 and be read by thermistor 19.

Figure 3:
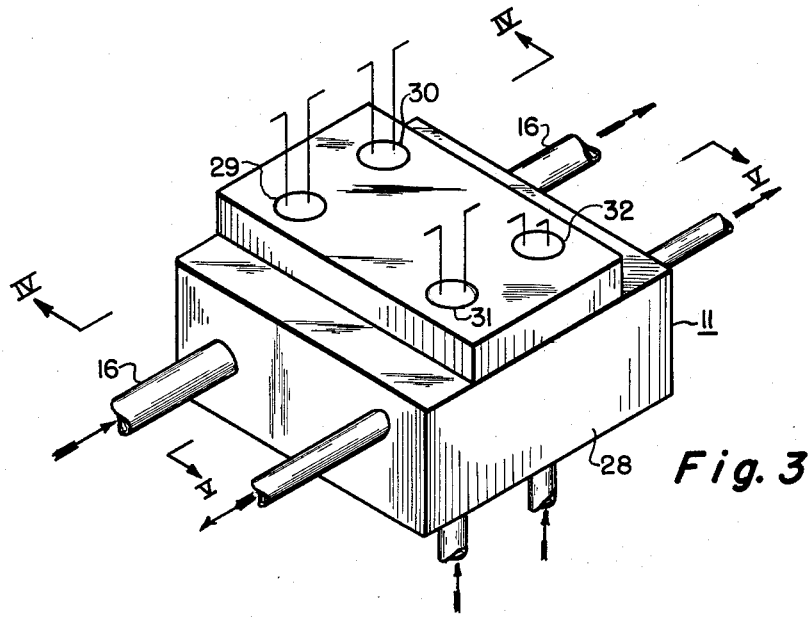
FIGURE 3 is a perspective view of a thermal conductivity cell which we have invented.
Figures 4, 5:
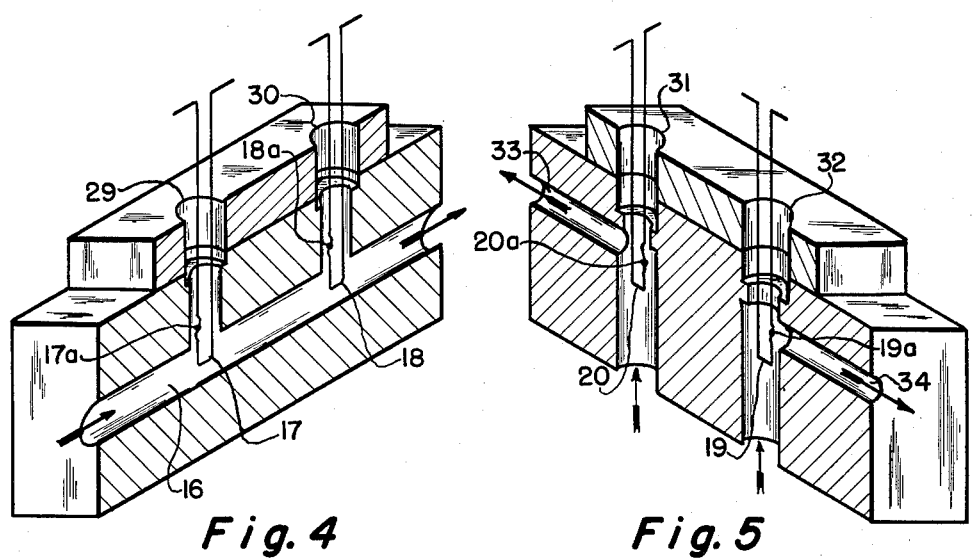
FIGURE 4 is a section along the lines IV—IV of FIGURE 3.
FIGURE 5 is a section along the lines V—V of FIGURE 3.

FIGURES 3 to 5, inclusive, illustrate the thermal conductivity cell 11. The cell comprises a block 28 having passages formed therein for the mounting of detectors, which in this instance are thermistors 17 to 20, inclusive, and for the flow of gases past the detectors. A passage 16 which extends longitudinally completely through the block receives carrier gas from a source of supply, not shown, and feeds it past reference thermistors 17 and 18 to the sample inlet. Two transverse passages 29 and 30 extend down from the top of the block and join the passage 16 at right angles thereto. The thermistors 17 and 18 are mounted in these transverse passages. Referring to FIGURE 4, it will be noted that the beads 17a and 18a of thermal sensitive material which form part of the thermistors are mounted in the passages 29 and 30 slightly above the passage 16. This positioning of the beads 17a and 18a causes the carrier gas to diffuse around them and thereby increases the stability of these reference thermistors.

The block also has two passages 31 and 32 which extend transversely of the block from top to bottom and which carry the sample thermistors 19 and 20. The block also has two horizontal passages 33 and 34 which extend from the passages 31 and 32 out through opposite ends of the block. Referring to FIGURE 5, it will be seen that the beads 19a and 20a which form part of the sample thermistors 19 and 20 are positioned in the passages 31 and 32 in line with the longitudinal axes of the passages 33 and 34. This positioning of the beads 19a and 20a causes the sample gases to flow directly over the thermistors, with the result that the thermistors "see" the sample gases immediately and "see" all of them. The thermistors, however, are in a relatively calm center of a turbulence created by the right angle bend in the gas flow.

The electrical connections between the thermal conductivity cell and the indicating or recording device and their manner of operation will now be described. The electrical resistance of thermistors varies with their temperature. In a thermal conductivity cell, the thermistors are heated to a temperature above ambient temperature by an electric current and sample gases are passed over them. When a gas is pased over a thermistor, the temperature of the thermistor is changed because the rate of transfer of heat from the thermistor to its surroundings is affected by the thermal conductivity of the gas. The thermal conductivity of gases varies from gas to gas and, therefore, as each gas passes over a thermistor, it will affect the temperature and therefore the resistance of the thermistor differently from each other gas.

In order to measure the change in resistance of the sample thermistors 19 and 20, we connect these two thermistors and two reference thermistors 17 and 18 in a Wheatstone bridge circuit, using each thermistor as one branch of the bridge circuit. We pass carrier gas past all four thermistors and balance the bridge. Thereafter, the components of the gas to be analyzed which have been separated pass over one or the other of the sample thermistors, as described above, and this unbalances the bridge. Unbalancing the bridge sends a voltage to an indicating instrument or a recording instrument which records the time and amount of the voltage.

Figure 6:
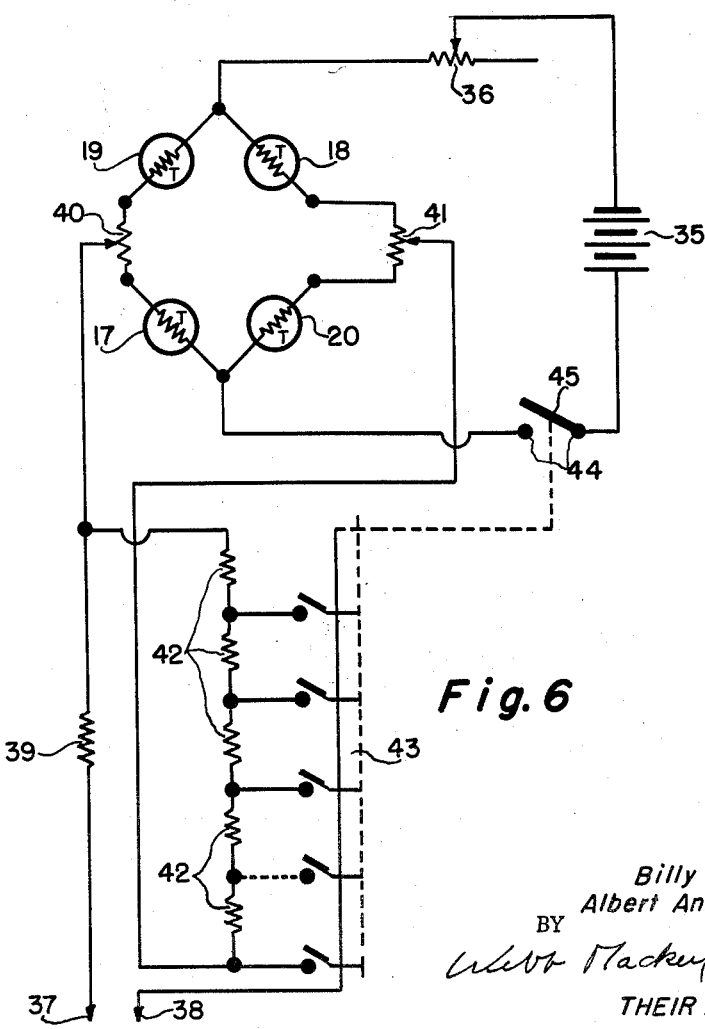
FIGURE 6 is an electrical diagram showing the electrical circuits for a thermal conductivity cell utilized in our apparatus.

FIGURE 6 shows the manner in which the four thermistors 17 to 20 of the thermal conductivity cell 11 form the four branches of a Wheatstone bridge. The battery 35 supplies current to the bridge through a variable resistance 36 used to control the current. Leads 37 and 38 are connected to a recording instrument, not shown. The lead 37 is connected to the bridge through a resistor 39, which acts as an impedance balance, and a variable resistance 40, which is used as a coarse balance for the bridge. Between the branches 18 and 20, there is a variable resistance 41 which may be manually controlled and used as a fine balance. A bank of resistors 42 are connected across the resistances 40 and 41 and the lead 38 may be connected into this bank of resistances at selected points across the bank by means of a multi push-button switch 43. The bank of resistors 42 and the switch 43 enable an operator to adjust the quantity of the voltage which will be received from the bridge when the bridge is unbalanced. The operator can thereby adjust the amount of swing of a needle in the indicating or recording device. Contacts 44 and switch arm 45 also form part of the push-button switch 43 and are provided to turn the entire circuit on and off.

Figure 7:
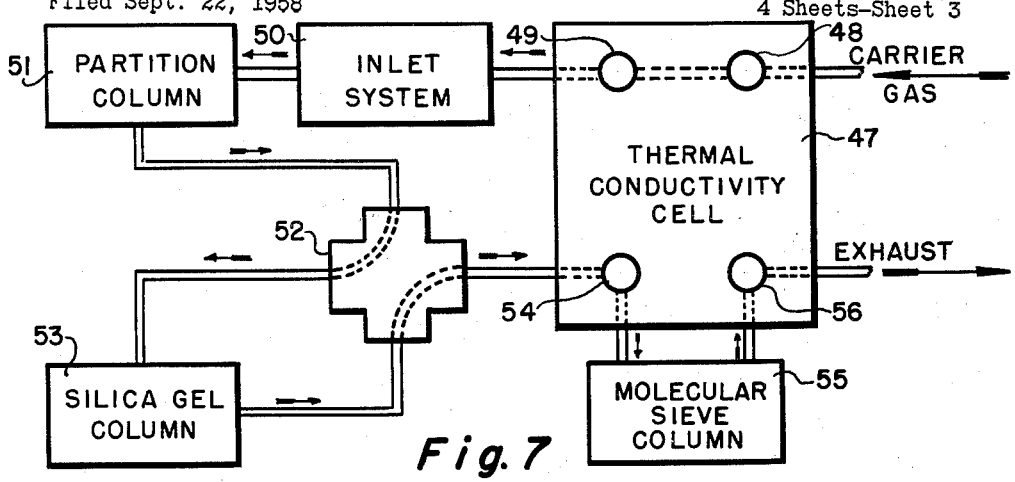
FIGURE 7 is a block diagram showing the arrangement of apparatus for carrying out a modification of the process described with reference to FIGURE 1.

FIGURE 7 illustrates a modified form of gas chromatography apparatus which we have invented in which three chromatographic columns are arranged in series so that additional gases may be detected and measured, particularly hydrocarbons and solvents. The apparatus includes a thermal conductivity cell 47, identical in construction to the cell 11 illustrated in FIGURES 3 to 5, inclusive. Carrier gas is supplied to the thermal conductivity cell and flows past two reference thermistors 48 and 49 and thence into an inlet system 50. From the inlet system, the gases flow into a chromatographic column 51, thence to a four-way valve 52. When the valve 52 is in the position shown diagrammatically in FIGURE 7, gases will flow to a column 53 and then to a sample thermistor 54 and from the thermistor 54 to a column 55 and thence over a second sample thermistor 56 to exhaust. As is apparent from FIGURE 7, the column 53 can be bypassed by turning the valve 52.

The operation of the apparatus shown in FIGURE 7 will now be explained, using as an example a sample gas mixture having the following components: oxygen, nitrogen, carbon monoxide, carbon dioxide, and ether. After a carrier gas has flowed through the system and the Wheatstone bridge circuit has been stabilized, the sample gas in injected into the inlet system 50. From there, the gases flow to the column 51.

In the particular example here given for purposes of illustration, the column 51 is a partition column of the type used to separate solvents and light hydrocarbons. Such columns contain inert, granular packing graded to a particular particle size and coated with a thin layer of liquid which has been selected in accordance with the material being analyzed. In the particular example here described, the partition column 51 is packed with diatomaceous earth coated with tri-m-cresyl phosphate.

In column 51, ether will move slower than all of the other components in the sample mixture being analyzed. The valve 52 is turned so that the gases which have been passed by the partition column 51 before the ether emerges from the column, i.e., oxygen, nitrogen, carbon monoxide, and carbon dioxide, flow into the column 53, which is a silica gel column. Oxygen, nitrogen, and carbon monoxide move more rapidly through column 53 than carbon dioxide. The more rapidly moving gases flow into the column 55, which is a molecular sieve column and which separates them so that they flow one at a time to the sample thermistor 56 in the following order: oxygen, nitrogen, and carbon monoxide. Each of these gases is read by the sample thermistor and an appropriate signal is sent to the recording device.

The silica gel column 53 has been so prepared, as explained above, that carbon dioxide will not emerge from it until the oxygen, nitrogen, and carbon monoxide have at least reached the molecular sieve column 55 where they are separated and read by the thermistor 56. When the carbon dioxide emerges from the column 53, it is read by the sample thermistor 54, which sends an appropriate signal to the recording device.

After the carbon dioxide has been read, the valve 52 is turned so as to bypass the column 53. Ether then flows from the partition column 51 through the valve 52 to the sample thermistor 54, which reads it and sends an appropriate signal to the recorder.

The above order of analysis of the sample gas can be changed by trapping the carbon dioxide in the silica gel column 53 by turning the valve 52. The ether which flows slowly through the partition column 51 can then be read by the sample thermistor 54 after the oxygen, nitrogen, and carbon monoxide have passed to the molecular sieve column 55. Thereafter, the valve 52 is turned so as to read the carbon dioxide from the silica gel column 53 in the sample thermistor 54.

Figure 8:
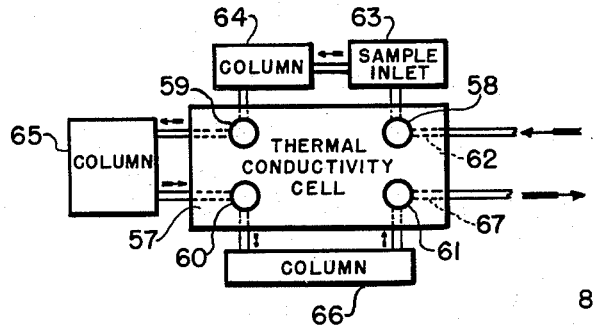
FIGURE 8 is a block diagram of a second modification of the process described with reference to FIGURE 1.

We have also developed apparatus in which three chromatographic columns are arranged in series to accomplish gas analysis as described with reference to the apparatus shown in FIGURE 7, but which apparatus does not require a four-way valve. This modified form of apparatus is shown in FIGURE 8. A thermal conductivity cell 57 is employed with four thermistors 58, 59, 60, and 61 mounted therein. However, each of these four thermistors is mounted in the cell as a "sample" thermistor; that is to say, each is mounted as are the sample thermistors 19 and 20 in the thermal conductivity cell illustrated in FIGURES 3 to 5, inclusive. See particularly FIGURE 5. A carrier gas is supplied through a passage 62 to the thermistor 58 which, as will be later explained, acts as a balance resistance. Gas flows from the thermistor 58 to a sample inlet 63, then to a chromatographic column 64, which may be a partition column similar to the partition column 51 in the apparatus illustrated in FIGURE 7. From the column 64, the sample flows past the thermistor 59 and into a column 65, which may be similar to the silica gel column illustrated in FIGURE 7. Gas then flows past a thermistor 60 into a third column 66, which may be similar to the molecular sieve column 55 in FIGURE 7. Gas then flows past a thermistor 61 and out to exhaust through a passage 67.

Figure 9:
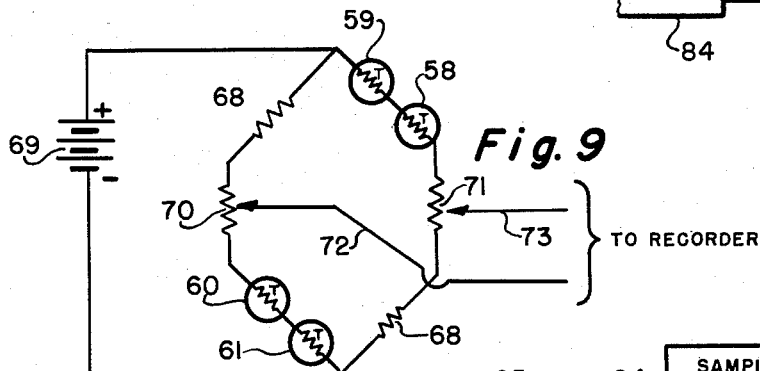
FIGURE 9 is an electrical diagram of the circuit of the conductivity cell when used as illustrated in FIGURE 8.

The electrical circuit for the thermal conductivity cell used in the apparatus of FIGURE 8 is illustrated diagrammatically in FIGURE 9. A Wheatstone bridge arrangement is again used, but none of the thermistors is used as a reference thermistor. Two thermistors 58 and 59 form one branch of the bridge and the other two thermistors 60 and 61 to form the opposite branch. In series with these two branches are fixed resistances 68, each of which forms a branch in the Wheatstone bridge and which are used as reference resistors in the bridge circuit. A battery 69 supplies current to the circuit. The circuit also includes a variable resistance 70 used for coarse balancing of the bridge circuit and a manually adjustable variable resistance 71 used for fine balancing of the bridge circuit. Leads 72 and 73 connect the bridge to an indicating or recording instrument.

The apparatus illustrated in FIGURES 8 and 9 can be used to make a gas analysis such as was described with reference to the apparatus shown in FIGURE 7 but without the use of a four-way valve. However, a more careful selection and calibration of the three columns is required than is the case with the apparatus shown in FIGURE 7. For example, if a sample mixture of oxygen, nitrogen, carbon monoxide, carbon dioxide, and ether is being analyzed, as was described with reference to FIGURE 7, then the column 64 of FIGURE 8 will be a conventional partition column, but the column will have to be carefully prepared and calibrated so that it will retard the movement of ether a sufficient length of time to enable the other components to reach the column 66 before ether emerges from the column 64. The columns 64 and 65 will also have to be prepared so that ether will not emerge from the column 64 at the same time that carbon dioxide emerges from the column 65.

Figure 10:
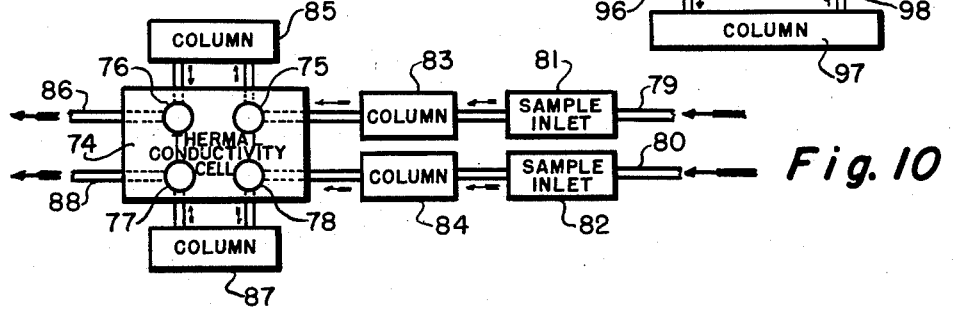
FIGURE 10 is a block diagram of a third modification of our process of gas analysis which is shown in FIGURE 1.

As we have pointed out above, each of the columns in our apparatus is prepared in accordance with known techniques in view of the gases which form part of the gas mixture to be analyzed. We have invented apparatus wherein two different gas mixtures may be analyzed, without, however, changing the columns. Such apparatus is illustrated in FIGURE 10. In essence, the apparatus comprises a thermal conductivity cell 74 having four thermistors 75, 76, 77, and 78, mounted therein in the same manner as the thermistors are mounted in the thermal conductivity cell shown in FIGURE 8; that is to say, they are mounted in the same manner as the "sample" thermistors 19 and 20 shown in FIGURE 6. The instrument shown in FIGURE 10 comprises two inlet passages 79 and 80 for the entrance of carrier gas into two sample inlets 81 and 82. Passages lead from the sample inlets to two columns 83 and 84. From the column 83, gas flows to the thermistor 75 and gas flows from the column 84 to the thermistor 78. From the thermistor 75, gas flows through a column 85 past the thermistor 76 and to exhaust through a passage 86. From the column 84, gas flows past the thermistor 78 into a column 87, thence past the thermistor 77 and out through a passage 88. In this instrument, there are thus two parallel paths for the flow of gas through the instrument. Carrier gas only is supplied to one path so that the thermistors in that path act as reference thermistors and the sample gas is injected into the other path through the sample inlet in that other path. Either path can be used alternately as a reference path or as a sample path. Only one gas mixture can be analyzed at a time, but at least two different gas mixtures can be analyzed in the instrument without changing the columns.

The apparatus shown in FIGURE 10, if slightly modified, can also be used to analyze a mixture in which the nature of the components of the mixture is such that more columns differing from each other are required than in the analyses heretofore described.

Figure 11:
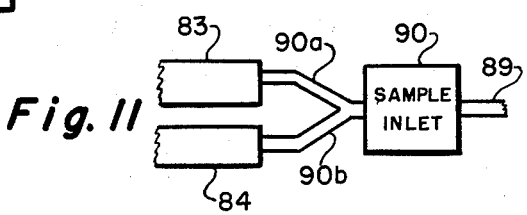
FIGURE 11 shows diagrammatically a modification to the apparatus shown in FIGURE 10.

The sample inlets 81 and 82 of FIGURE 10 are eliminated and a single passage 89 is used for the supply of a carrier gas. This leads to a sample inlet 90 which, in turn, has two branches 90a and 90b leading to columns 83 and 84, as shown in FIGURE 11. The balance of the apparatus is the same as that shown in FIGURE 10.

Using, as an example, a gas mixture to be analyzed comprising four components A, B, C, and D, the mixture is inserted into the sample inlet 90. It then flows in parallel to the columns 83 and 84. Column 83 will retard the flow of component A, permitting the components B, C, and D to flow at a greater rate and reach column 85 considerably in advance of component A. The difference in rates of movement of components B, C, and D through the column 83 is such that components B and C are separated in column 85 and are read by thermistor 76. As component A emerges from the column 83, it is read by thermistor 75. At the same time, column 84 permits components A, B, and C to move through the column at a faster rate than component D. Component D is thereby separated from the other components and read by thermistor 78.

Figure 12:
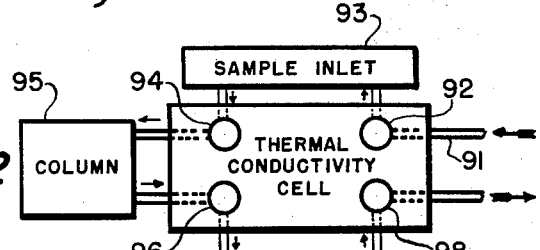
FIGURE 12 is a block diagram of a fourth modification of our process of gas analysis which is shown in FIGURE 1.

A thermal conductivity cell such as is shown in FIGURES 8 and 10 can be arranged with a sample inlet and columns to measure quantitatively the volume of a sample mixture being analyzed and to thereafter detect components in the mixture. Such an arrangement is shown in FIGURE 12.

The apparatus comprises an inlet 91 for the supply of carrier gas which passes over a thermistor 92 which acts as a balancing resistor. The carrier gas then flows to a sample inlet 93 where the sample to be analyzed is injected into the carrier gas. The carrier gas with the sample then passes over a thermistor 94 which will send a signal corresponding in strength to the total volume of the sample injected into the carrier gas. If the signal is received by a recording instrument which is calibrated, the area under the peak produced in the chart from this first signal can be measured and the total volume of the sample thereby determined.

From the thermistor 94, the carrier gas and the sample flow into the column 95, over the thermistor 96, into the column 97, and over the thermistor 98 to exhaust. The column 95, thermistor 96, column 97, and thermistor 98 separate and read the components in the sample in the same manner as the columns and thermistors shown in FIGURE 1.

The method and apparatus which we have invented for gas analysis and which we have described above enable an operator to analyze a gas mixture in a much shorter time than has heretofore been possible by known gas chromatography techniques and apparatus. Likewise, the apparatus and the arrangement of the apparatus are much simpler than apparatus heretofore used for making similar gas analyses and, therefore, are less expensive. Also, because of its relative simplicity, it is portable.

The apparatus can be operated by a relatively unskilled operator and it does not require continuous attention if a recording device is used to receive the signals from the detector. By the arrangement of the columns and detectors with respect to each other, time is inherently built into the operation so that signals generated by the passage of a component past a detector are always recorded in respect to time and can thereby be identified.

While we have described certain presently preferred embodiments of our invention, it is to be understood that they may be otherwise embodied within the scope of the appended claims.

We claim:

1. Gas chromatographic apparatus comprising, a source of carrier gas, means forming a flow path for flowing the carrier gas over first and second detectors in series, a sample inlet connected to the exit end of said means beyond the second of said two detectors, a first chromatographic column connected to said sample inlet, a third detector positioned in said flow path at the exit end of said first column, a second chromatographic column connected to the exit end of the first column beyond said third detector, a fourth detector positioned in said flow path at the exit end of the second column, a measuring bridge circuit in which said first and second detectors form geometrically opposing arms and in which said third and fourth detectors form geometrically opposing arms, said first and second detectors initiating electrical signals in the output of said measuring bridge circuit when carrier gas alone flows past them, and said third and fourth detectors initiating electrical signals in the output of said measuring bridge circuit when carrier gas alone flows past them and when components of the sample flow past them in the carrier gas, the packing and capacity of the columns being such that signals initiated by the detectors when components of the sample in the carrier gas flow by the third and fourth detectors are spaced from each other in point of time.

2. Gas chromatographic apparatus as described in claim 1 and having valve means in said flow path between the exit end of the first column and the entrance of said third detector for directing said flow path to the entrance end of a third chromatographic column and from the exit end of the third column to said third detector, said valve means closing both ends of said third column when the flows path goes from the exit end of the first column to the third detector.

3. Gas chromatographic apparatus comprising, a source of carrier gas, means forming a flow path for flowing the carrier gas over a first detector, a sample inlet connected to the exit end of said means beyond said first detector, a first chromatographic column connected to said sample inlet, a second detector positioned in said flow path at the exit end of said first column, a second chromatographic column connected to the exit end of the first column beyond said second detector, a third detector positioned in said flow path at the exit end of the second column, a third chromatographic column connected to the exit end of the second column beyond said third director, a fourth detector positioned in said flow path at the exit end of the third column, a measuring bridge circuit in which the first and second detectors are in one arm and the third and fourth detectors are in a geometrically opposing arm, said circuit also having fixed reference resistors in the remaining geometrically opposed arms, said detectors initiating electrical signals in the output of said measuring bridge circuit when carrier gas alone flows past them and when components of the sample flow past them in the carrier gas, the packing and capacity of the columns being such that signals initiated by the detectors when components of the sample in the carrier gas flow by the detectors are spaced from each other in point of time.

4. Gas chromatographic apparatus comprising, a source of carrier gas, means forming a flow path for flowing the carrier gas over a first detector, a sample inlet connected to the exit end of said means beyond said first detector, a second detector positioned in said flow path at the exit end of the sample inlet, a first chromatographic column connected to the exit end of the sample inlet beyond said second detector, a third detector positioned in said flow path at the exit end of the first column, a second column connected to the exit end of the first column beyond the third detector, a fourth detector positioned in said flow path at the exit end of the second column, a measuring bridge circuit in which the first and second detectors are in one arm and the third and fourth detectors are in a geometrically opposing arm, said circuit also having fixed reference resistors in the remaining geometrically opposed arms, said detectors initiating electrical signals in the output of said measuring bridge circuit when carrier gas alone flows past them and when components of the sample flow past them in the carrier gas, the packing and capacity of the columns being such that signals initiated by the detectors when components of the sample in the carrier gas flow by the detectors are spaced from each other in point of time.

5. Gas chromatographic apparatus comprising, a source of carrier gas, means forming a flow path for flowing the carrier gas over a first detector, a sample inlet connected to the exit end of said means beyond said first detector, a second detector positioned in said flow path at the exit end of the sample inlet, a first chromatographic column connected to the exit end of the sample inlet beyond said second detector, a third detector positioned in said flow path at the exit end of the first column, a second column connected to the exit end of the first column beyond the third detector, a fourth detector positioned in said flow path at the exit end of the second column, a measuring bridge circuit in which said first and second detectors form geometrically opposing arms and in which said third and fourth detectors form geometrically opposing arms, said detectors initiating electrical signals in the output of said measuring bridge circuit when carrier gas alone flows past them and when components of the sample flow past them in the carrier gas, the packing and capacity of the columns being such that signals initiated by the detectors when components of the sample in the carrier gas flow by the detectors are spaced from each other in point of time.

6. Gas chromatographic apparatus comprising, a source of carrier gas, means forming two parallel flow paths for flowing the carrier gas, a sample inlet connected in each of said flow paths, a first chromatographic column in each flow path connected to the exit of the sample inlet in that flow path, first detectors positioned in each of said two flow paths at the exit ends of said first chromatographic columns, second chromatographic columns connected to the exit end of the first column in each flow path beyond said first detectors, a second detector positioned in each of said flow paths at the exit end of the second columns in each flow path, a measuring bridge circuit in which the first and second detectors in each flow path form geometrically opposing arms, said detectors initiating electrical signals in the output of said measuring bridge circuit when carrier gas alone flows past them and when components of the sample flow past them in the carrier gas, the packing and capacity of the columns being such that signals initiated by the detectors when components of the sample in the carrier gas flow by the detectors are spaced from each other in point of time.

7. A thermal conductivity cell comprising a mounting block, a passage extending longitudinally through the block for the flow of gas therethrough, two passages extending substantially at right angles to the longitudinal passage and leading from said passage through an outer surface of said block, a detector in each of said passages which extend at right angles to the longitudinal passage and spaced from said longitudinal passage, two passages extending through the block and spaced from said longitudinal passage so as not to intersect therewith, and a passage connected to and leading from each of said last two passages and extending at right angles therefrom to outer surfaces of the block whereby gases flowing through said last two passages and connecting passages make a right angle bend, and detectors positioned approximately at the intersection of the axis of each pair of connecting passages whereby the detectors are positioned directly within the gas flow but in a relatively calm center of a turbulence created by the right angle bend in the gas flow.

8. A thermal conductivity cell as described in claim 7, in which the detectors have beads of thermosensitive material and in which the beads of the detectors mounted adjacent the longitudinal passage are positioned in the passages which extend at right angles to said longitudinal passage and away from said longitudinal passage and in which the beads of the detectors mounted in said pairs of passages which extend at right angles to each other are positioned approximately at the intersection points of the axes of each pair of connecting passages.

9. A thermal conductivity cell comprising a mounting block, four first passages extending toward the interior of said block from its outer surface, said passageways terminating within the block at positions spaced from each other, four second passages connected to said first passages at the inner ends of the first passages, each of said second passages extending at right angles to the first passage to which it is connected and through an outer surface of the block, said first and second passages forming openings with the outer surfaces of the blocks through which they extend whereby gas may flow through said first and second passages and make a right angle bend at the intersection of said first and second passages, and a detector positioned in the block approximately at each intersection of said first and second passages whereby the detectors are positioned directly within the gas flow but in a relatively calm center of a turbulence created by the right angle bend in the gas flow.

References Cited in the file of this patent

UNITED STATES PATENTS

| | | |
|---|---|---|
| 2,687,036 | Minter | Aug. 24, 1954 |
| 2,868,011 | Coggeshall | Jan. 13, 1959 |

OTHER REFERENCES

Separation of Hydrocarbons and Related Components, by Patton et al., in Analytical Chemistry, vol. 27, No. 2, February 1955, pages 170–174, 73–23c.

Vapor Fractometry, by H. H. Hausdorff, published by Perkin-Elmer Corporation, Norwalk, Conn., 1955, page 8. (Copy in 73–23c.)

Articles: Journal of Scientific Instruments, Ambrose et al., vol. 32, August 1955, page 323. (Copy in 73–23c.)

Canadian Journal of Chemistry, Callear et al., vol. 33, 1956, pages 1256–1266.

Analytical Chemistry, Madesen, vol. 30, No. 11, November 1958 (Symposium, September 1957) pages 1859–1862. (Copy in 73–23c.)